(12) United States Patent
Hammerschmidt et al.

(10) Patent No.: US 8,005,642 B2
(45) Date of Patent: Aug. 23, 2011

(54) PREDICTIVE ANGULAR SENSOR READOUT

(75) Inventors: Dirk Hammerschmidt, Villach (AT); Wolfgang Granig, Sachsenburg (AT); Sabine Salzmann, Villach (AT)

(73) Assignee: Infineon Technologies AG, Neubiberg (DE)

( * ) Notice: Subject to any disclaimer, the term of this patent is extended or adjusted under 35 U.S.C. 154(b) by 183 days.

(21) Appl. No.: 12/146,633

(22) Filed: Jun. 26, 2008

(65) Prior Publication Data

US 2009/0326859 A1    Dec. 31, 2009

(51) Int. Cl.
*G01C 19/00* (2006.01)

(52) U.S. Cl. ........................ 702/151; 702/94; 702/150

(58) Field of Classification Search ............ 702/151
See application file for complete search history.

(56) References Cited

U.S. PATENT DOCUMENTS

| | | | |
|---|---|---|---|
| 4,654,861 A | 3/1987 | Godard | |
| 5,386,373 A * | 1/1995 | Keeler et al. | 700/266 |
| 5,706,445 A | 1/1998 | Milhaupt et al. | |
| 5,732,158 A | 3/1998 | Jaenisch et al. | |
| 2002/0173931 A1 * | 11/2002 | Dudler et al. | 702/151 |
| 2003/0006921 A1 | 1/2003 | Stetson et al. | |
| 2003/0035499 A1 * | 2/2003 | Staszewski et al. | 375/346 |
| 2007/0118286 A1 | 5/2007 | Wang et al. | |

FOREIGN PATENT DOCUMENTS

| | | |
|---|---|---|
| GB | 2265775 | 10/1993 |
| GB | 2289998 | 12/1995 |

* cited by examiner

*Primary Examiner* — Jonathan C Teixeira Moffat
(74) *Attorney, Agent, or Firm* — Dicke, Billig & Czaja, PLLC

(57) ABSTRACT

A sensor readout includes a selector circuit, a predictor circuit, and a select controller. The selector circuit receives a plurality of actual sensor inputs. Each actual sensor input is provided to the selector circuit along a corresponding channel. The selector circuit also passes a selected sensor input. The predictor circuit receives the selected sensor input into a signal history and generates predicted sensor inputs. The select controller receives the predicted sensor inputs, determines which of the predicted sensor inputs is most changed from the actual sensor inputs as the most changed input, and directs the selector circuit to pass a next signal on a the channel having the most changed input.

25 Claims, 9 Drawing Sheets

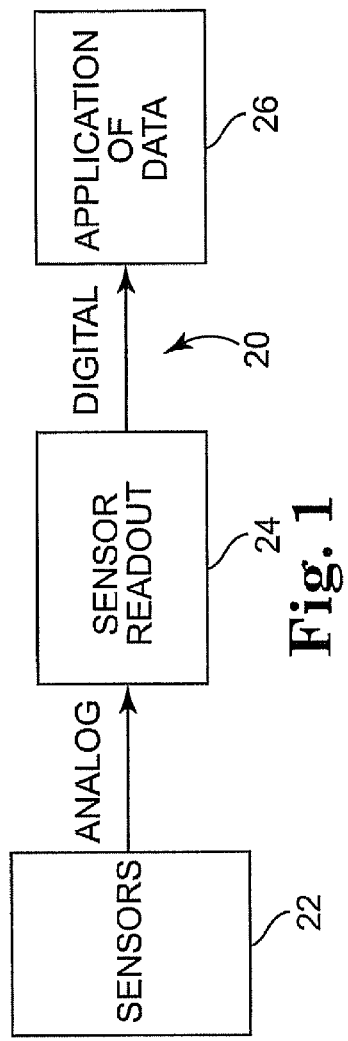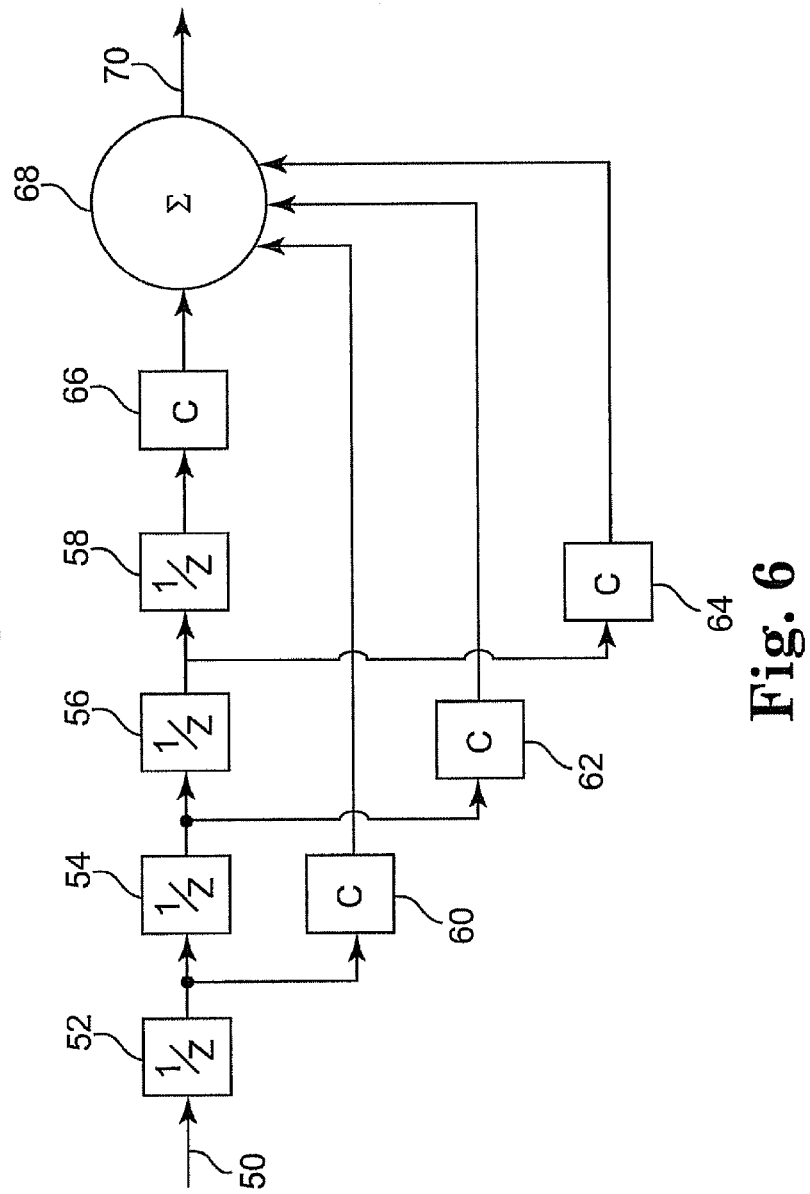

PREDICTIVE ANGULAR SENSOR READOUT

BACKGROUND

This disclosure relates to angular sensors or field sensors used for angular measurements and their corresponding sensor readouts. More particularly, this disclosure relates to an angular sensor readout that predicts the next angular measurement to more quickly determine the location of the next angular measurement along a trajectory.

Recently, sensor readouts have begun to include predictors to determine the next likely output from the sensor. This can help to prepare the readout for the next actual output from the sensor and thus help to speed up and use less power than in previous readouts. A predictive sensor readout generally includes a sampling circuit configured to receive and oversample previously digitized samples of signals previously input from a sensor. A predictor circuit, or predictor engine, receives the over-sampled previously digitized samples into a signal history and to generate a predicted input from the sensor based on the signal history. A preset circuit presets the sampling circuit to receive the predicted input from the sensor prior to sampling an actual input from the sensor.

Predictor circuits work more precisely the higher the oversampling rate. In many cases, the sensor is used to provide a single output to the readout. In the case of angular sensors, however, at least two sensor outputs are provided to the readout. These two sensor outputs, such as angle and radius or linear x and y components of a trajectory vector, are provided to the readout to describe the direction, angle, rotation, or the like of the measured trajectory. In these cases, the oversampling rate can be effectively halved from that of one sensor output as the angular sensor outputs are multiplexed between the two measurements. This slows the readout or provides for less precision in the readout output. Also, power consumption can be increased and speed can be further compromised as the readout prepares itself for the alternating measurements.

SUMMARY

A sensor readout is illustrated and disclosed. The sensor readout includes a selector circuit, a predictor circuit, and a select controller. The selector circuit receives a plurality of actual sensor inputs. Each actual sensor input is provided to the selector circuit along a corresponding channel. The selector circuit also passes a selected sensor input. The predictor circuit receives the selected sensor input into a signal history and generates predicted sensor inputs. The select controller receives the predicted sensor inputs, determines which of the predicted sensor inputs is most changed from the actual sensor inputs as the most changed input, and directs the selector circuit to pass a next signal on a the channel having the most changed input.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a schematic diagram illustrating an example environment of the present disclosure including a sensor readout.

FIG. 6 is a schematic diagram illustrating an example component of the example of FIG. 3.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that the features of the various exemplary embodiments described herein may be combined with each other, unless specifically noted otherwise.

FIG. 1 illustrates a general overview of an environment of an example of the present disclosure. FIG. 1 illustrates a system 20, including one or more sensors 22, a readout 24, and a processor 26. The sensors 22 are capable measuring external physical properties such as angular rotation from an angular sensor and providing a plurality of sensor outputs corresponding with sensor data such as the measured physical property. The plurality of sensor outputs is provided to the readout 24 as an analog signal representative of the sensor data. The readout is capable of reading the signals provided by the sensors. The readout 24 receives the plurality of sensor outputs and converts the analog signal, such as a voltage level, into a digital signal, which represents the sensor data. The readout 24 provides the digital signal to processor 26. The processor 26 can be any circuit for transforming or applying the sensor data in the digital signal into a usable manner and need not be a microprocessor or the like. The processor receives the digital signal from the readout 24 and prepares the signal for use, whatever the appropriate use might be.

Figure 2:
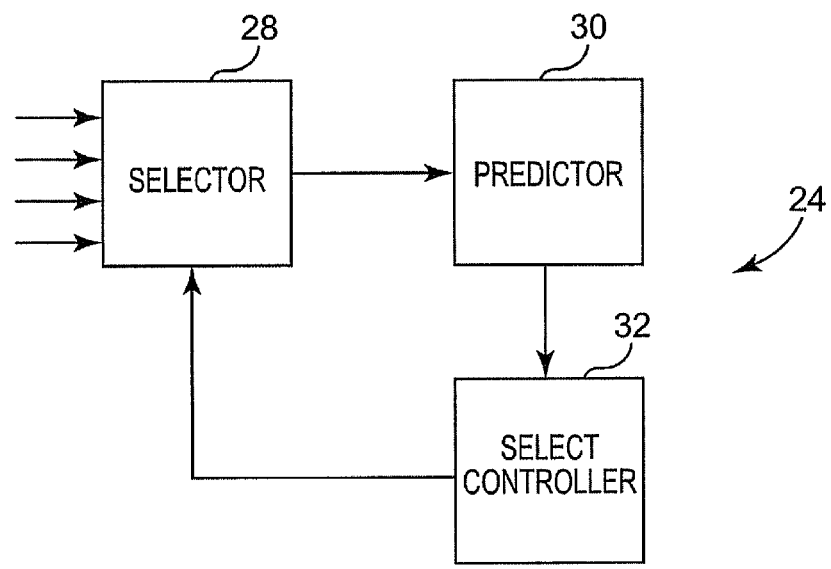
FIG. 2 is a schematic diagram illustrating aspects of the sensor readout of FIG. 1.

FIG. 2 illustrates an overview of features of the readout 24. The readout 24 includes a selector 28, a predictor 30, and select controller 32. The selector 28 is configured to receive a plurality of sensor output signals provided to the selector along corresponding sensor channels. The plurality of sensor output signals in the illustrated example includes two sensor output signals x and y. The selector 28 passes one of the sensor output signals x or y to a predictor. The predictor 30 is configured to prepare the readout 24 for the next selected sensor output signals, which includes providing a prediction signal to the select controller 32. The select controller 32 is configured to apply the prediction signal to estimate the most likely next sensor output signal x or y, depending on which of the sensor output signal is most likely to change the most between the two sensor output signals. The select controller 32 is also configured to direct the selector 28 to select the sensor channel having the next the sensor output signal x or y determined most likely to change the most. In one example, the predicted values of x and y are compared to the corresponding last measured values of x and y. The channel having the greatest difference between the predicted value and the last measured value is the one determined most likely to change the most.

Figure 3:
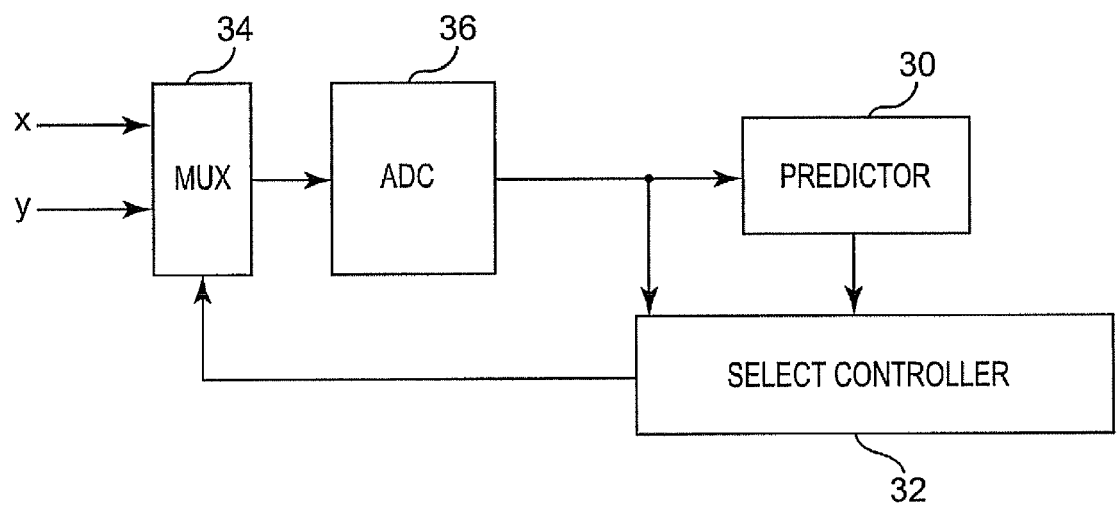
FIG. 3 is a schematic diagram illustrating an example of the aspects of the sensor readout of FIG. 2.

FIG. 3 illustrates one particular example of the readout including the features described above in FIG. 2. The example includes the sensor output signals x and y provided to a multiplexer 34, an analog to digital converter (ADC) 36, the predictor 30, and the select controller 32. The multiplexer 34 is configured to receive the sensor output signals x and y and pass one of the signals x or y to the ADC 36. The ADC 36 receives the sensor output x or y and converts the analog signal into a digital signal representative of the sensor data. The ADC provides a digital signal representative of the sensor data to the predictor 30. The predictor 30 is configured to estimate the most likely next signal from the sensor output signal x or y as a predicted signal. The predictor 30 is coupled to the ADC, which uses the predicted signal to prepare the ADC 36 for the next sensor output from the multiplexer 34. For example, the predicted signal can be use to pre-charge capacitors within the ADC 36 so as to reduce the time needed to convert the sensor output signals into digital signals, which provides for a faster sensor readout. In one example, the ADC 36 is a successive approximation register analog to digital converter (SAR ADC)

The predicted signal and the digital signal representative of the sensor data are also provided to the select controller 32. The select controller 32 is configured to determine based on the predicted signal and the digital signal representative of the sensor data which sensor output x or y is most likely to change the most. On that determination, the select controller 32 directs the multiplexer 34 to next pass the sensor output x or y most likely to change the most.

Figure 4:
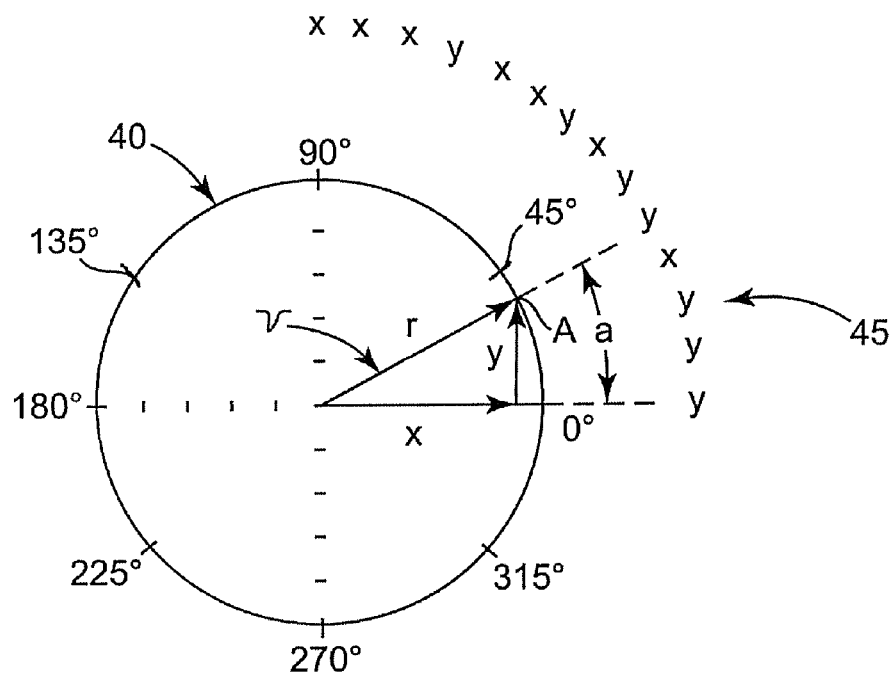
FIG. 4 is a schematic diagram illustrating an example trajectory of an angular sensor providing an output to the sensor readout of FIG. 1.
Figure 5:
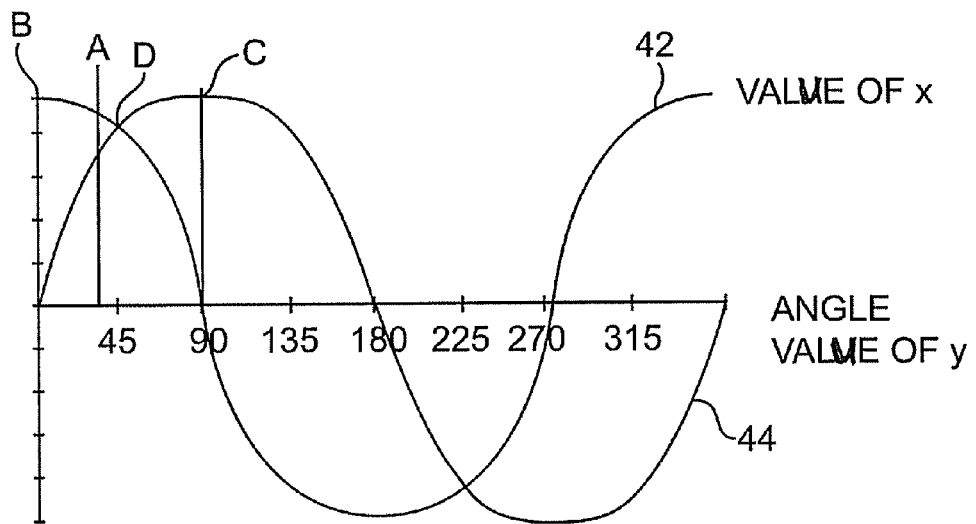
FIG. 5 is a graph illustrating linear components as a function of trajectory angle of the example trajectory of FIG. 4.

FIGS. 4 and 5 illustrate an example of a determination of which sensor output is most likely to change in the context of an angular sensor. FIG. 4 illustrates a possible trajectory 40 of a rotation vector v of an angular sensor, where the trajectory 40 is circular. Any arbitrary point, such as Point A, on the trajectory 40 can be described in angular components as having a radius r and an angle a. The radius of the rotation vector v can be assumed not to change, or not to change significantly. This assumption can be made in situations such as with magnetic field sensors where the radius represents field strength of the magnet multiplied by the sensitivity to change. Both of these change only with ambient temperature change or with aging and thus have a relatively low bandwidth.

Point A can also be described in linear components as having an x component and a y component. When the radius of the trajectory is generally constant, the x and y linear components generally correspond with the cosine and sine, respectively, of angle a. FIG. 5 illustrates corresponding values of the x component 42 and the y component 44 of the rotation vector v as it traverses the trajectory 40 of FIG. 4. In the case of a constant radius, the x and y component values 42, 44 correspond with cosine and sine curves as a function of angle a. In the example above, the x and y sensor outputs correspond to the x and y components of an angular trajectory, respectively. The x and y sensor outputs can correspond with x and y components of a single angular sensor, or two sensors can be used where one sensor provides the x component as a sensor output signal and the other sensor provides the y component as the sensor output signal to the multiplexer 34.

In cases where the angle of the trajectory vector v are at or around 0 degrees or 180 degrees, such as point B of FIG. 5 at 0 degrees, the absolute value of the slope of the y component is greater than the absolute value of the slope of the x component, and the value of the y component is expected to change at a greater rate than the value of the x component. In these cases, the select controller 32 can direct the multiplexer 34 to select the y component to pass as the sensor output signal y most likely to change the most. Similarly, in cases where the angles are at or around 90 degrees or 270 degrees, such as point C of FIG. 5 at 90 degrees, the absolute value of the slope of the x component is greater than the absolute value of the slope of the y component, and the value of the x component is expected to change at a greater rate than the value of the y component. In these cases, select controller 32 can direct the multiplexer 34 to select the x component to pass as the sensor output signal x most likely to change. Still further in case where the angles are at or around 45, 135, 225, and 315 degrees, such as point D of FIG. 5 at 45 degrees, the x and y sensor outputs have the same or approximately the same value and nearly the same absolute value of slope. The select controller can direct the multiplexer 34 to select either the sensor outputs x or equally as often such as in an alternating or interleaved pattern because the absolute values of the slopes are about equal. Thus, for example along the scale of 0 to 90 degrees, select controller 32 directs the multiplexer 34 to select the y sensor output more often than the x sensor output, the x and y sensor outputs are sampled equally, and the x sensor output more often the y sensor output.

A selection pattern is illustrated in FIG. 4 as an example selected sampling sequence 45. In the illustrated example, the selection of the x or y channel changes as the trajectory vector traverses from 0 degrees to 90 degrees in the following pattern: yyyxyyxyxxyxxx. The y component of the vector v is expected to change the most at or near 0 degrees; whereas the x component of the vector is expected to change the most at or near 90 degrees. Around 45 degrees, the x and y components are expected to change about the same. Of course, other selection patterns can be used including ones with more than a sequence of fourteen samples from 0 degrees to 90 degrees.

The predictor 32 in the example can include any one of several known linear or nonlinear prediction engines. FIG. 6 illustrates an example of a prediction engine 46, which can be constructed as a finite impulse response (FIR) filter. An input signal 50 is provided from the ADC 36 and is passed through a register block that functions as a series of unit delay elements such as 52, 54, 56, and 58. The output signal of each of the delay elements is applied to the inputs of the coefficient elements illustrated as 60, 62, 64, and 66. A summation is formed at summing junction 68 resulting in an output 70, which can then be provided as an output from the predictor 32.

The example FIR filter is a linear predictor. The transfer function of the example prediction engine 46 results in $$H(z) = 4z^{-1} - 6z^{-2} 30\ 4z^{-3} - z^{-4}$$

According to this function, coefficient element 60 provides the signal output from delay element 52 with a multiplier of (4); coefficient element 62 provides the signal output from the delay element 54 with a multiplier of (−6); coefficient element 64 provides the signal output from the delay element 56 with a multiplier of (4); and coefficient element 66 provides the signal output from the delay element 58 with a multiplier of (−1). The number of coefficient elements and delay units as well as the multiplier of the coefficient elements can be changed depending on the transfer function used when the predictor is a FIR filter.

The transfer function can relate to the accuracy of the predictor. The simplest predictor, or a zero order predictor, merely uses the last sample as an estimation for the actual signal and has a transfer function of $z^{-1}$. If the signal is highly oversampled by a factor of OSR (oversampling rate) and the ADC 36 is still able to sample signals that quickly, then the maximum difference of the actual signal and the previous one is the quantization range divided by the OSR. The higher order predictors can improve the estimated values by including derivations of the previous samples.

Figure 7:
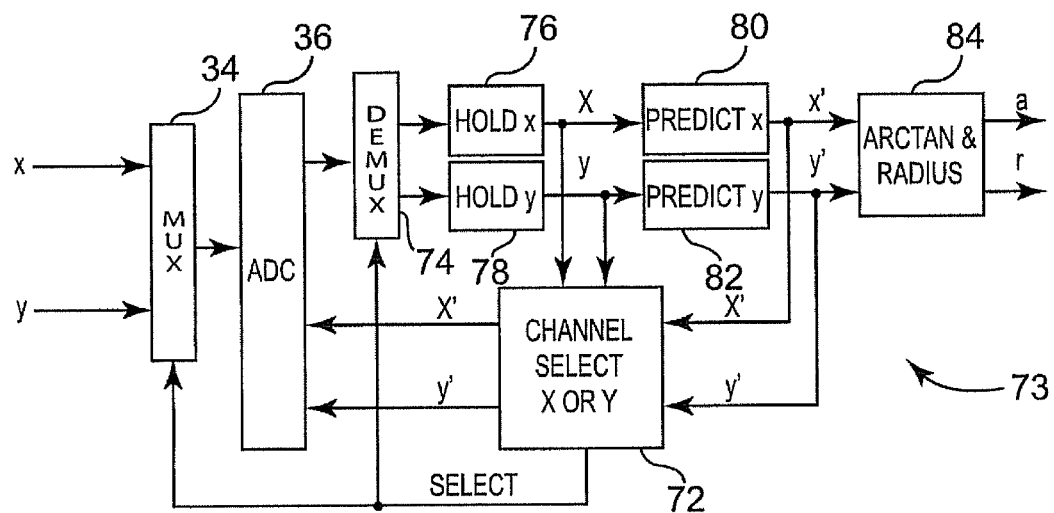
FIG. 7 is a schematic diagram of illustrating an embodiment of the example of FIG. 3.

FIG. 7 illustrates an example of a sensor readout 73 constructed in accordance with the example shown in FIG. 3. The multiplexer 34 is configured to receive the sensor output signals x and y and pass one of the signals x or y to the ADC 36 for sampling. A select controller 72 directs the multiplexer 34 to next pass the sensor output x or y. The ADC 36 receives the sensor output x or y and converts the analog signal into a digital signal representative of the sensor data.

The ADC provides the digital signal representative of the sensor data to a demultiplexer 74. The digital signal is demultiplexed as directed by the select controller and is provided to an x hold element 76 or a y hold element 78. If the sensor output signal x is provided to the ADC 36, then the digital signal is demultiplexed into the x hold element 76. Similarly, if the sensor output signal y is provided to the ADC 36, then the digital signal is demultiplexed into the y hold element 78.

The hold elements 76, 78 store the newest demultiplexed digital signals representative of the sensor outputs x and y until they are overwritten with new demultiplexed digital signals. The x hold element 76 provides its stored digital signal to the x channel predictor 80, and the y hold element 78 provides its stored digital signal to the y channel predictor 82. The predictor estimates the most likely next samples for each of the sensor output signals x and y based on the most recent values stored in the hold elements 76, 78 and provides a predicted x signal (x') and a predicted y signal (y') as outputs. In one example, the x channel predictor 80 and y channel predictor 82 can each receive the digital signals stored in both of the x and y hold elements. Given the interdependence of sine and cosine, and thus the x and y signals, the predictors can be made more reliable when using the information from both signals. In particular x is the cosine of the angle a, which is equal to the deviation of y as it is the sine of angle a. Filtering noise and other disturbances from the signals stored in the hold elements can enhance prediction.

The select controller 72 receives the predicted x and predicted y signals (x', y') as well as the values stored in the hold elements 76, 78 (x, y). Based on these inputs to the select controller, the select controller determines which the x or y sensor measurement is likely to exhibit the greater change by comparing the stored digital signal in the hold element to the corresponding predicted signal. The select controller 72 then directs the multiplexer 34 to select the signal expected to change the most for the next measurement.

Accordingly, the selection of the sensor output signals x or y is based on which predicted signal is expected to change the most from the previously measured signal. The sensor output expect to change the most is measured more often. The digital signals stored in the hold elements 76, 78 have different ages as new digital signals were provided to the hold elements at different times. After several repeated updates of one hold element based on selected samples, the other hold element may no longer accurately correspond with the sensor output signal x or y not selected to be sampled, which is called divergence. If this can be the case, the select controller 72, or other suitable component of the readout, can limit the amount of continuous sampling of one of the sensor signals x or y to a selected number until the other sensor signal y or x is sampled.

The predicted x and y signals (x', y') can also be provided through a digital to analog converter (DAC) (not shown) coupled to or integrated into the ADC 36 circuit. The applications of the predicted value to assist in determining performance of obtaining the next value are legion, and are too numerous to list here. One skilled in the art given this disclosure can readily imagine many different applications. In one example, the ADC 36 receives the predicted x and y signals (x' and y') and converts them back into an analog signals. The predicted analog signals are subtracted from the next input to the ADC 36 from the multiplexer 34. The resulting difference is a "residual error" to the change of the next input from the multiplexer 34, and is quantized. The more accurate the prediction, the smaller the residuum, and the smaller the required quantization range of the ADC 36. The digital output of the ADC 36 is calculated by adding the predicted component to the quantized residuum. The predicted signals are used to help prepare the ADC for faster response to the next signal input, which results in less power consumed by the readout.

Predicting the sensor output expected to change the most enhances the speed of the readout. For example, the oversampling rate (OSR) of the predictor is effectively halved when the ADC alternates sampling between the x and y signals. Now, by sampling the x and y signals expected to change the most, the ADC often avoids alternating sampling between the x and y signals, which increases the OSR to more of what it could be if only one signal was sampled.

The readout 73 also can include a feature where the predicted x and y signals are provided to a linear to angular converter 84 that converts the (predicted) linear x and y components of the trajectory vector to (predicted) angle a and radius r components of the trajectory vector as an output from the readout 73. As an alternative, the linear to angular converter 84 can be removed and the predicted x and y signals are provided as an output of the readout 73

Figure 8:
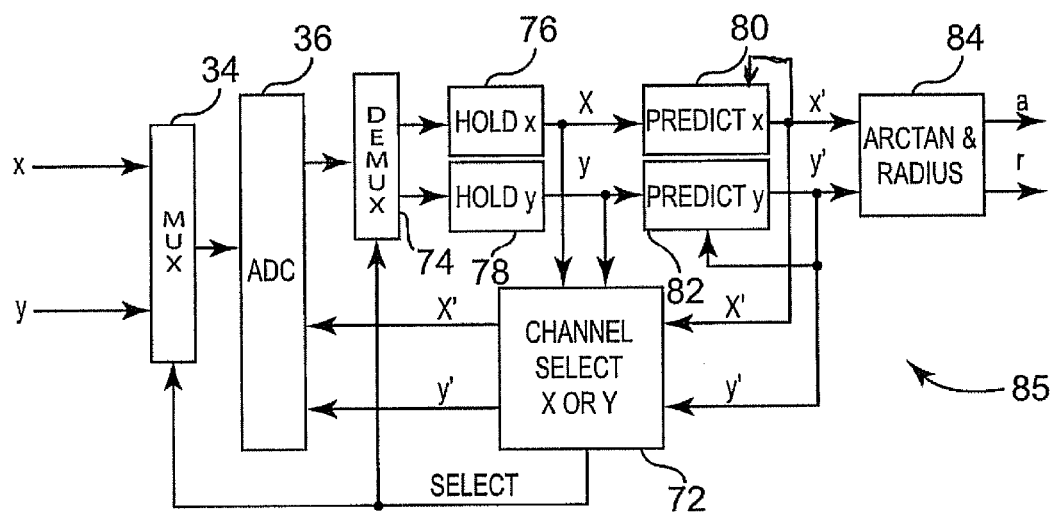
FIG. 8 is a schematic diagram of illustrating another embodiment of the example of FIG. 3.

FIG. 8 illustrates a readout 85 including generally the same components and their functions as shown as readout 73 in FIG. 7. As an alternative to readout 73, readout 85 includes the possibility of the predictors 80, 82 to select between using the x and y signals from the hold elements 76, 78 and the predicted x and y signals from the predictors 80, 82. For example, the predictor will select the x or y signal from the hold element if the x or y signal is new, and the predictor will feed back the predicted x or y signal from the non-new signal in the hold element. This can address the age difference between the new signal in the one hold element and the non-new signal in the other hold element, and provides more accurate prediction than before. Again, the select controller 72, or other suitable component of the readout, can limit the amount of continuous sampling of one of the sensor signals x or y to a selected number until the other sensor signal y or x is sampled in order to avoid the possibility of unacceptable amounts of divergence.

Figure 9:
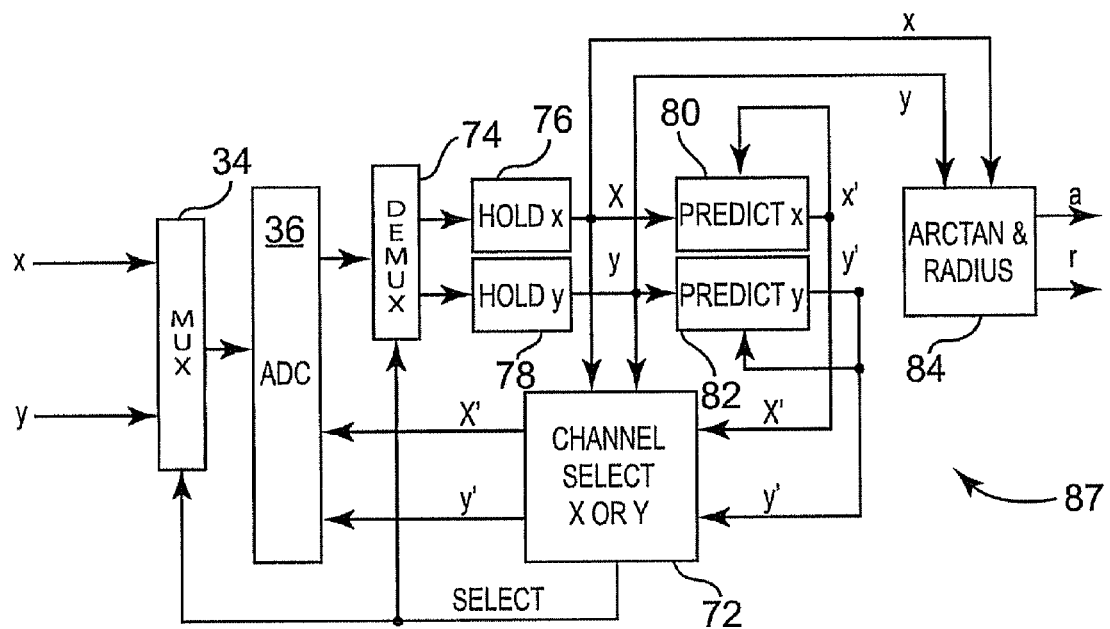
FIG. 9 is a schematic diagram of illustrating another embodiment of the example of FIG. 3.

FIG. 9 illustrates a readout 87 including generally the same components and their functions as shown as readout 85 in FIG. 8. As an alternative to readout 85, readout 87 provides the most recently measured values of the x and y sensor output signals from the hold elements 76, 78 to the linear to analog converter 84 to determine an output of the readout 87. In the alternative, the most recently measured values of the x and y sensor output signals from the hold elements 76, 78 can be used as the output of readout 87. Unacceptable amounts of divergence can lead to the wrong multiplexer channel being selected, and the thus wrong predicted signal is provided. The readout 87 reduces effects of divergence by outputting a measured value rather than a predicted value and thus eliminating one possible order of divergence.

Figure 10:
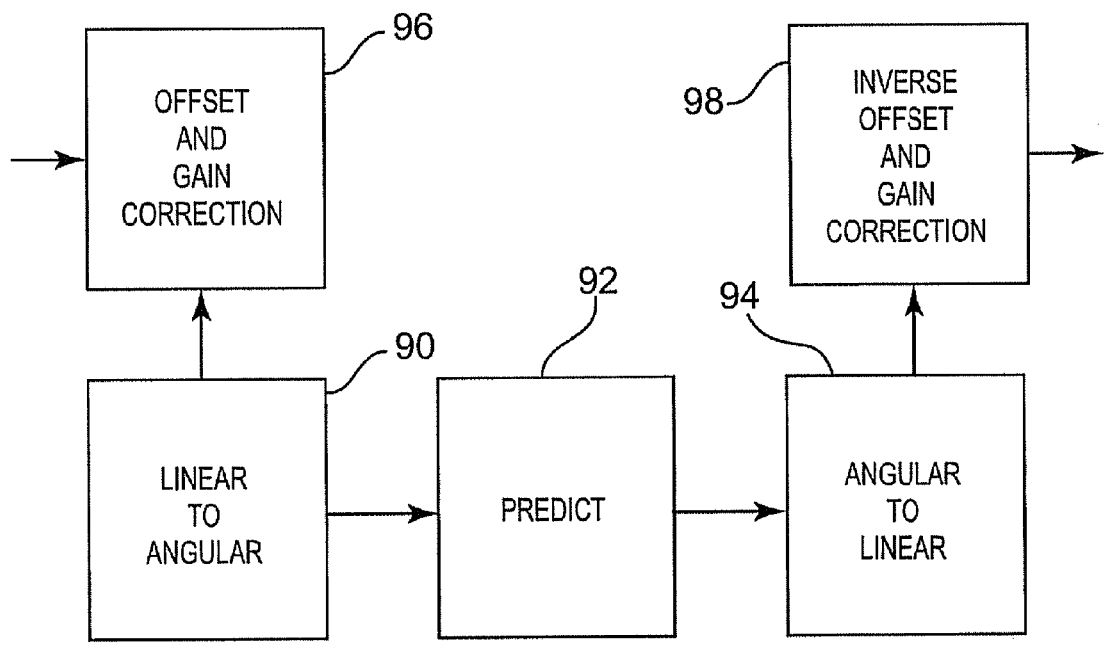
FIG. 10 is a schematic diagram of illustrating an alternative aspect of the embodiments of FIGS. 7-9.

In an example illustrated in FIG. 10, the digital signals corresponding with the sensor output signals x and y representative of a trajectory vector can be provided to a linear to angular converter 90 to provide corresponding angular components a and r of the trajectory vector. The angular components a and r are provided to a predictor 92 to provide predicted values of components a and r. These predicted components of a and r are then passed through a angular to linear converter 94 to obtain predicted signals for x and y that can be used in the above described readouts.

The linear to angular converter 90 receives the digital signals corresponding with the sensor output signals x and y and applies a function to determine corresponding arctangent and radius values as part of the conversion. Similarly, the angular to linear converter 94 receives the predicted angular components and applies a function to determine corresponding sine and cosine values as part of the conversion. The use of the converters 90, 94 improves the efficiency of the predictor 92. Measured values of sine and cosine, which are present in linear measurements, are highly non-linear even if the angle rotation is at a constant speed or changes at a relatively low rate. This additional non-linearity is avoided if angle and radius measurements are provided to the predictor 92. The removal of the additional nonlinearity results in a better prediction with angular components than with linear components at a given oversampling rate. Also, a simpler predictor can be used for angular components with same or similar accuracy in prediction than for linear components. These advantages come at the expense of speed of the readout, which can be significant, but also provides a readout designer with alternatives depending on the readout features desired.

In some examples, the multiplexer 34 is provided with analog sensor output signals x and y from a single field sensor. In other examples, two field sensors are used where one of the field sensors provides the x signal and the other of the field sensors provides the y signal. In the case of two different sensors, the values of x and y actually originate from two differently measured trajectories, where the difference from a single measurement is characterized as an offset. Similarly, the two sensors could have different physical characteristics from each other thus affecting gain in the measured values. These aspects of offset and gain can be corrected prior to with a correction circuit 96 prior to linear to angular conversion to make the digital representation of the sensor output signals x and y appear to include the same amplitude and origin, or otherwise appear to be provided from a single sensor.

The correction circuit 96 can apply offset and gain correction to one component or both depending on designer preference. Also, after the angular to linear converter 94 and prior to providing the predicted x and y signals to the ADC 36, the converted predicted signals x and y can be provided to an inverse offset and gain correction circuit 98, which will undo the effects of the correction circuit 96, and create a predicted digital signal that corresponds with the same level as the digital representations of the sensor output signals x and y. The examples that do not convert the linear components to angular components can avoid the extra complexity of offset and gain correction and inverse offset and gain correction.

Figure 11:
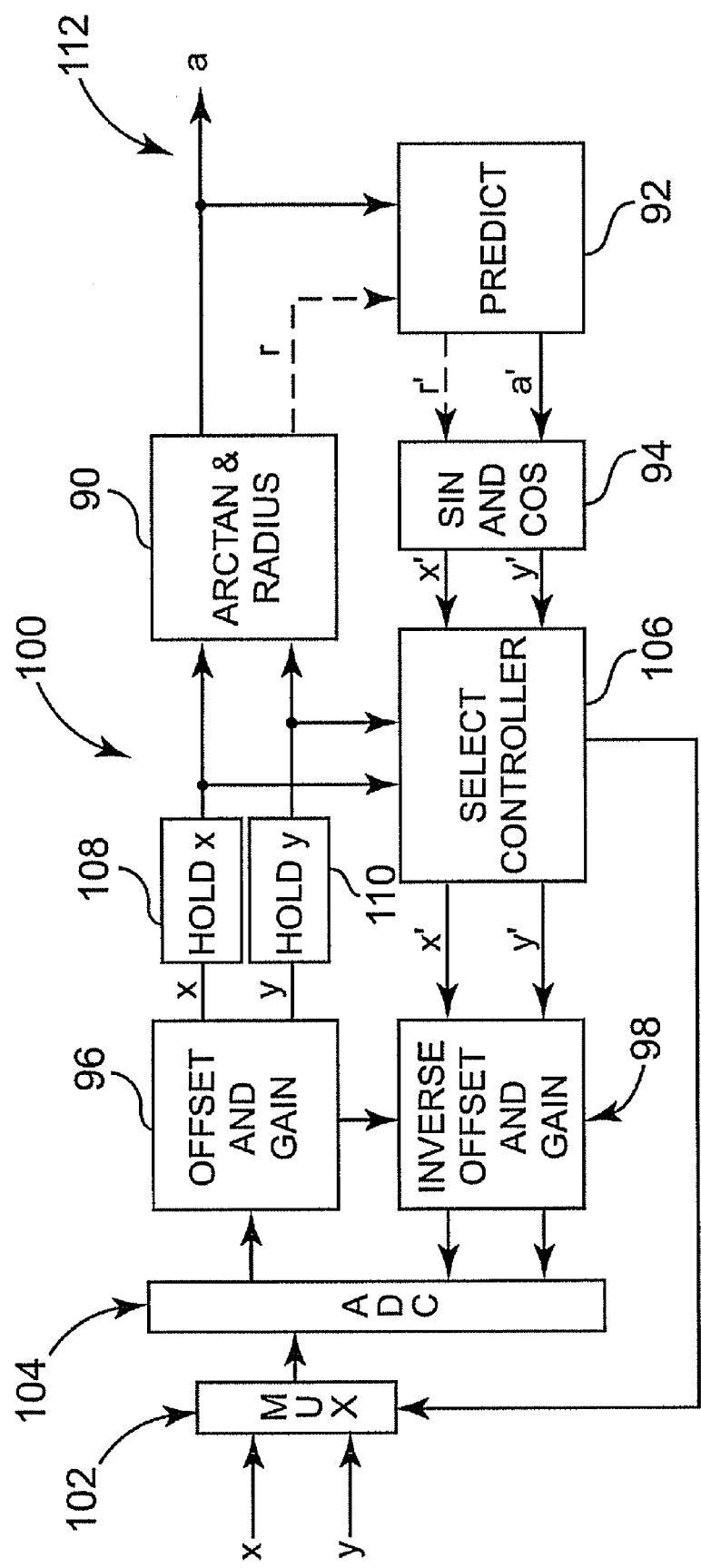
FIG. 11 is a schematic diagram illustrating another embodiment of the example of FIG. 3 including the alternative aspect of FIG. 10.

FIG. 11 illustrates an example readout 100 with the features described above in relation to FIG. 10 and is also constructed in accordance with FIG. 3. The readout 100 includes a multiplexer 102 configured to receive sensor output signals x and y and pass one of the signals x or y to an ADC 104 for sampling. A select controller 106 directs the multiplexer 102 to next pass the sensor output x or y. The ADC 104 receives the sensor output x or y and converts the analog signal into a digital signal representative of the sensor data. The digital signal representative of the sensor data can then be demultiplexed as directed by the select controller 106 and passed into an offset and gain correction circuit 96. The corrected digital signal can be passed to either an x hold element 108 or a y hold element 110, as before.

In this example, the linear to angular converter 90 receives the digital signals from the hold elements 108, 110, and the converter 90 applies a function to determine corresponding arctangent and radius values as part of the conversion, which provides angular components a and r that correspond with the measured trajectory vector. The converted values a and r are then passed to the predictor 92. Subsequent the predictor 92, the angular to linear converter 94 is applied to the predicted angular components a' and r' to obtain predicted x' and y' components. As in the above examples, the predicted x' and y' components are provided to the select controller 106. In this example, the inverse offset and gain correction circuit 98 is applied to the predicted x' and y' components, which undoes the effects of the offset and gain correction circuit 96, which are passed to the ADC 104.

In one example, the radius r of a rotation vector of the trajectory can be assumed not to change, or not to change significantly, to further simplify the predictor 92. This assumption can be made in situations such as with magnetic field sensor devices where the radius represents field strength of the magnet multiplied by the sensitivity to change, as described above. Both of these change only with ambient temperature change or with aging and thus have a relatively low bandwidth. If this assumption is used in the example readout 100, the angle component a, and not the radius component r, is provided to the predictor 92. In this example, a predictor can be made to be simpler than if both angular components are provided. This example is indicated in FIG. 11 where the radius r and predicted radius component r' are shown in phantom. One skilled in the art can leave in or take conversion of the radius component from the converters 96, 98, and leave in or take out a radius prediction engine from the predictor 92.

Variations of the readout 100 are possible. One skilled in the art can rearrange the components of the offset and gain correction circuit 96, hold elements 108, 110, and the linear to angular converter 90 components in other orders than the one shown in the example readout 100. Similarly, one skilled in the art can also rearrange the components of the inverse offset and gain correction circuit 98, the angular to linear converter 94, and the select controller 106. Still further, an output 112 of angle component a can be replaced with a predicted output angle a' or any of the outputs provided in the above examples.

Figure 12:
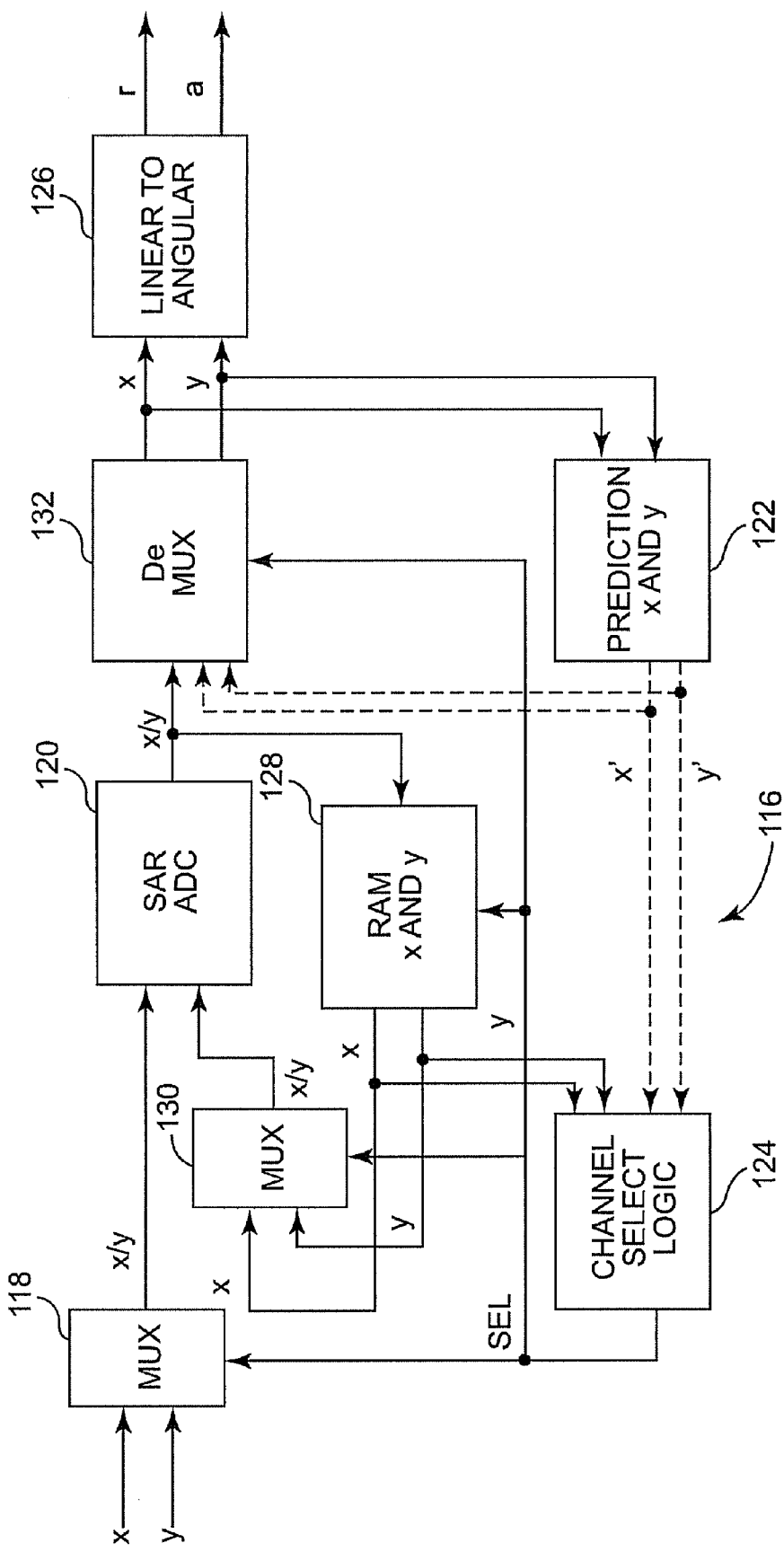
FIG. 12 is a block diagram illustrating another embodiment of the example of FIG. 3.

FIG. 12 illustrates an example readout 116 including a first multiplexer 118, an ADC 120, such as successive approximation register analog to digital converter, an x and y predictor 122, a select controller 124, and a linear to angular converter 126 to output angular components from the readout 116. The readout 116 also includes a memory 128, such as a volatile memory, which stores the digital x and y signals as output from the ADC 120, a second multiplexer 130 coupled to the memory 128 to select the stored x and y channel to provide to the ADC 120, and a demultiplexer 132 with inputs coupled to the output of the predictor 122 and the ADC 120 and an output coupled to the predictor 122 and the linear to angular converter 126. Each of the memory 128, the first and second multiplexers 118, 130, and the demultiplexer 132 are coupled to the select controller 124.

In the readout 116, the ADC 120 is prepared based on a history of measured signals rather than with a history of predicted signals, which can be a valid design alternative. Accordingly, start up values for the ADC 120 can be taken from at least the predictor or a memory of previously measured signals. Often, the length of the path of the start up values can be a cue to choosing how to prepare the ADC. In the examples shown above, the path from the predictors to the ADC was relatively short. In the present example readout 116, the path of the predictor 122 to the ADC 120 is longer than the path from the memory 128 to the ADC 120. A shorter path provides for easier monitoring of stability than a longer path. In the example readout 116, the first and second multiplexers pass the values from the same channels of x or y, so that the ADC 120 is prepared with the same channel that is being measured.

Another addition feature of readout 116 is the use of the channel selected demultiplexer 132 that receives inputs from the predictor 122. The demultiplexer 132 in this example is used to provide x and y signals to the linear to angular converter 126, which uses both x and y components to provide angle and radius measurements for output from the readout 116. The ADC 120 provides as an output the digital representation of the measured x or y signal to the demultiplexer 132. The channel select 124 is used to help the demultiplexer 132 select the other of the x or y component from the predictor 122. For example, if the ADC outputs an x signal, this x signal will be one output of the demultiplexer. The channel select is used for the demultiplexer to provide the predicted y signal as the other output of the demultiplexer so the linear to angular converter is able to use an x and a y component of a trajectory vector to output an angle and radius of the trajectory vector.

Figure 13:
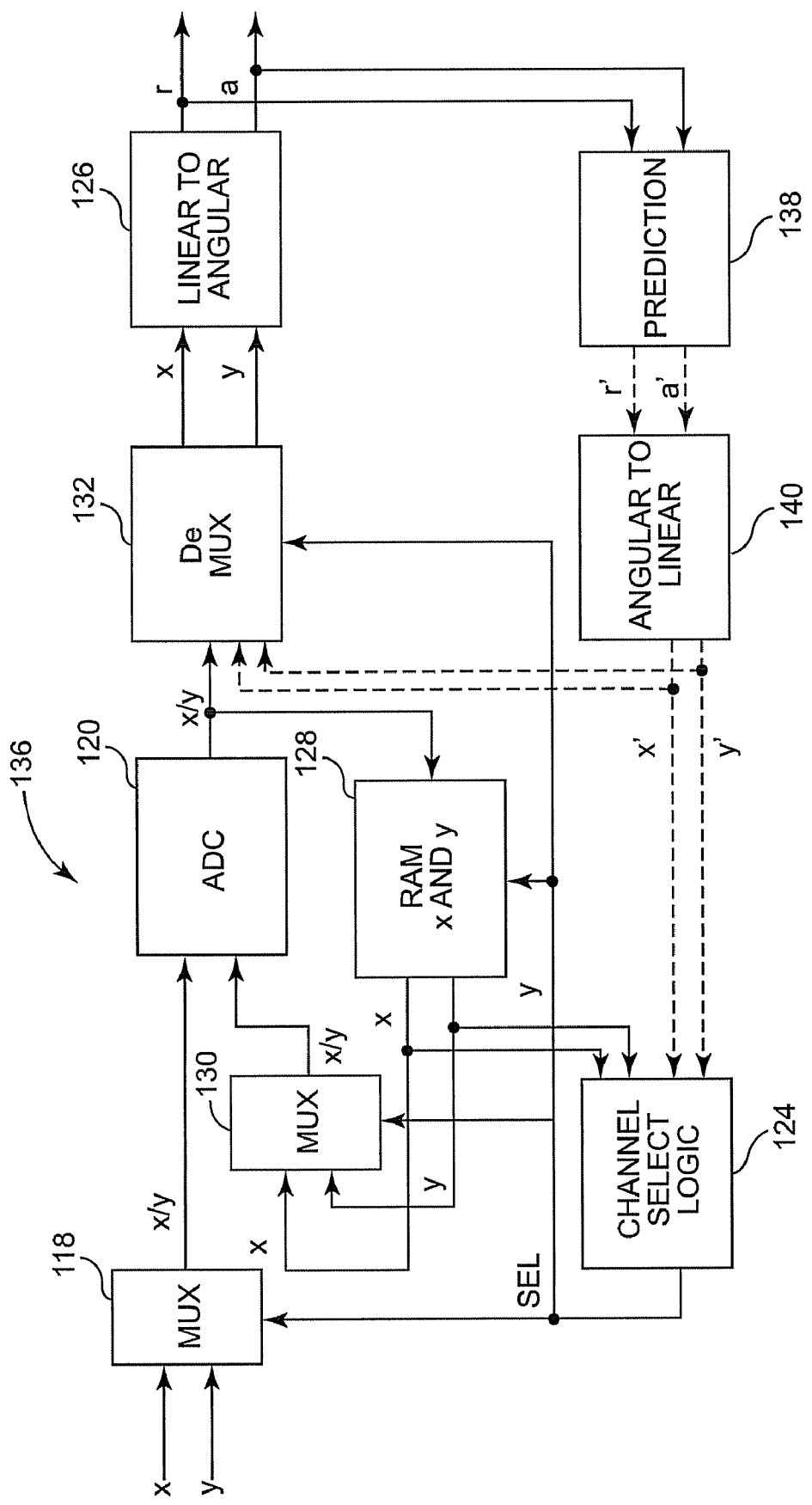
FIG. 13 is a block diagram illustrating another embodiment of the embodiment of FIG. 12 including the aspect of FIG. 10.

FIG. 13 illustrates another example readout 136 including some similar parts as readout 116. Readout 136 includes the first and second multiplexers 118,130, the ADC 120, the select controller 124, the linear to angular converter 126, the memory 128, and the demultiplexer 132. In the readout 136, the linear to angular converter provides an output of the readout as before, but it also provides an input to a predictor 138. The predictor uses the angular components a, r to provide predicted angular components a', r' similar to that of FIG. 10. The predicted angular components are provided to an angular to linear converter 140 that provides its output of predicted linear components x', y' to both the inputs of the select controller 124 and demultiplexer 132.

Figure 14:
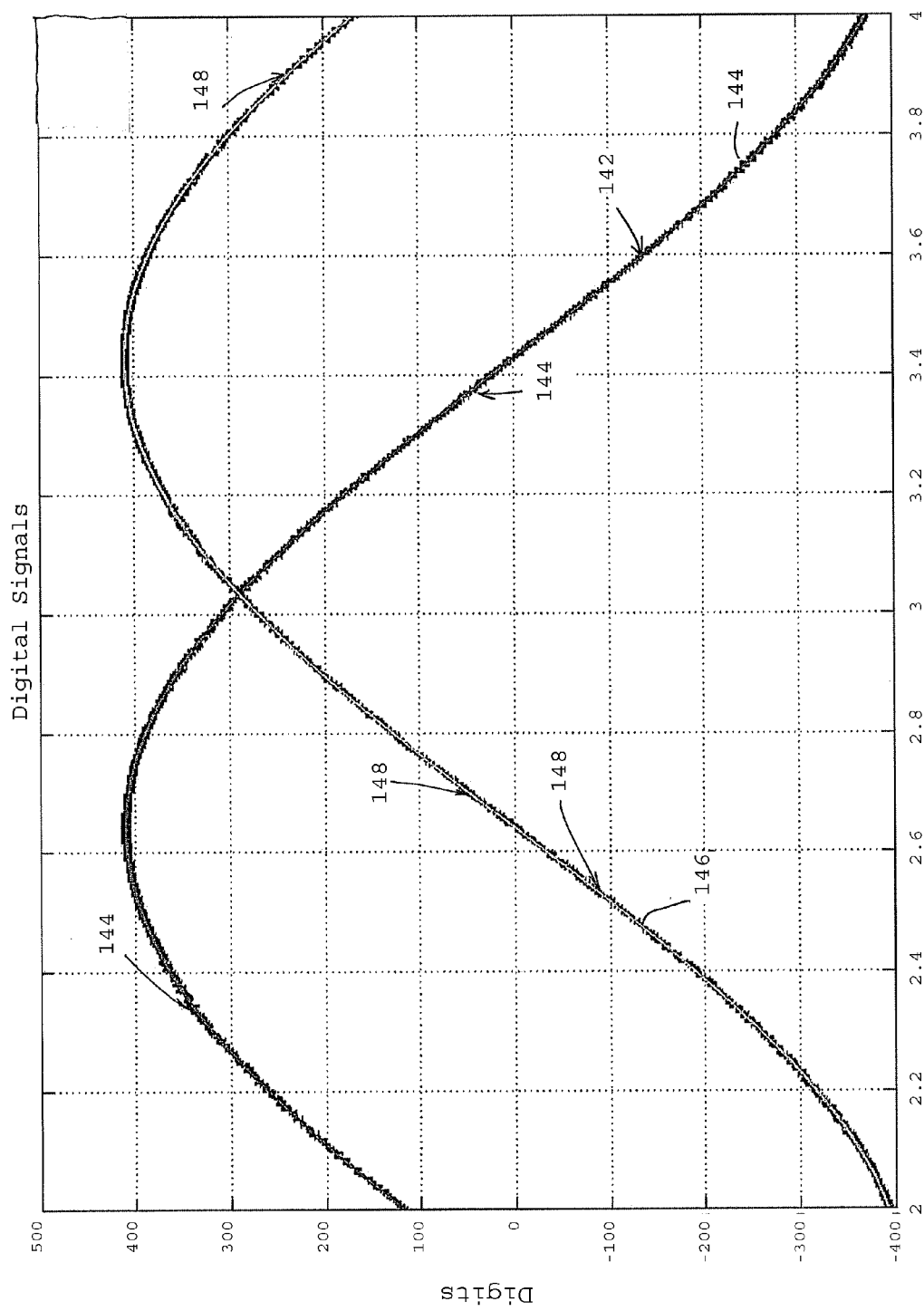
FIG. 14 is a graph illustrating an example output of an embodiment of FIG. 3.

FIG. 14 illustrates a graph depicting an output of an example readout constructed in accordance with the example of FIG. 3 as a function of time. The actual x component as the trajectory vector rotates is represented by the curve 142. The predicted component x' is shown as the points 144 about the curve 142. Similarly, the actual y component as the trajectory vector rotates is represented by the curve 146. The predicted component y' is shown as the points 148 about the curve 146.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A sensor readout, comprising:
a selector circuit having a first input channel configured to receive a first component of an actual sensor input and a second input channel configured to receive a second component of the actual sensor input, and to pass a currently selected one of the first and second components of the actual sensor input as an output of the selector circuit;
a signal history including a plurality of hold elements coupled to the selector circuit, wherein a first hold element of the plurality of hold elements is configured to store a first signal representing a most recently passed first component and wherein a second hold element of the plurality of hold elements is configured to store a second signal representing a most recently passed second component;
a predictor circuit configured and to generate a corresponding predicted sensor input for each channel based on the signal history; and
a select controller coupled to the predictor circuit and the selector circuit, wherein the select controller is configured to receive the predicted sensor inputs, to determine which of the predicted sensor inputs is most changed from the corresponding most recently passed components in the signal history as the most changed input, and to direct the selector circuit to pass a next actual sensor input on the channel corresponding with the most changed input; and
a de-selector circuit coupled to the select circuit, the select controller and the signal history, wherein the de-selector circuit is configured to provide the output of the selector circuit to one of the first and second hold elements as directed by the select controller.

2. The sensor readout of claim 1 wherein the selector circuit is configured to sample the selected sensor input.

3. The sensor readout of claim 2 wherein the selector circuit includes a multiplexer and an analog to digital converter.

4. The sensor readout of claim 3 wherein the select controller is coupled to the multiplexer and to direct the selector circuit to pass a next signal on the channel corresponding with the most changed input.

5. The sensor readout of claim 4 wherein the predictor circuit includes a linear prediction engine.

6. The sensor readout of claim 5 wherein the linear prediction engine includes a finite-impulse-response filter.

7. The sensor readout of claim 1 wherein the select controller is configured to compare the predicted sensor inputs to the actual sensor inputs to determine which of the predicted sensor inputs is most changed from the actual sensor inputs.

8. A sensor readout, comprising:
a multiplexer configured to receive a plurality of channels each providing a present actual sensor signal output and to pass one of the present actual sensor signal outputs, wherein the plurality of channels includes a first component and a second component;

an analog to digital converter configured to receive the passed actual sensor signal output and to create a digital representation of the passed actual sensor signal output, wherein the analog to digital converter is coupled to a plurality of hold elements, wherein a first hold element is configured to store a digitized first signal representing a most recently sampled first component and wherein a second hold element is configured to store a digitized second signal representing a most recently sampled second component;

a predictor configured to receive the digital representation of the one of the sensor signal outputs and to provide predicted sensor signal outputs for each of the plurality of channels, wherein each of the hold elements is coupled to a corresponding prediction engine; and a select controller configured to determine the channel having a most changed sensor output based on a latest passed actual sensor signal outputs and the predicted sensor signal outputs for each of the plurality of channels, wherein the latest passed actual sensor signal outputs includes the passed present actual sensor signal output and at least one previously passed actual sensor signal output, and operably coupled to the multiplexer to pass a next actual sensor signal output on the channel corresponding with the most changed sensor output, and wherein outputs of the prediction engines are provided to the select controller and to the analog to digital converter.

9. The sensor readout of claim 8 wherein the multiplexer is configured to receive two channels.

10. The sensor readout of claim 8 wherein the first component includes a linear x component of a trajectory vector from an angular sensor and the second component includes a linear y component of the trajectory vector from the angular sensor.

11. The sensor readout of claim 10 wherein the first hold element is configured to store a digitized x signal representing the a most recently sampled linear x component and wherein the second hold element is configured to store a digitized y signal representing the a most recently sampled linear y component.

12. The sensor readout of claim 11 wherein the prediction engines include an x prediction engine corresponding with the first hold element and a y prediction engine corresponding with the second hold element.

13. The sensor readout of claim 12 wherein an output of the x prediction engine and an output of the y prediction engine are provided to the select controller and to the analog to digital converter.

14. The sensor readout of claim 13 wherein one of the first hold element or the output of the x prediction engine is provided as an input to the x prediction engine and wherein one of the second hold element or the output of the y prediction engine is provided as an input to the y prediction engine.

15. The sensor readout of claim 12 wherein an output of the x prediction engine and an output of the y prediction engine are provided to an output of the readout.

16. The sensor readout of claim 15 wherein the output of the readout includes a linear to angular converter configured to receive and convert the outputs of the x and y prediction engine to angular components of the trajectory vector.

17. The sensor of claim 11 wherein the stored digitized x signal and the stored digitized y signal are provided to an output of the readout.

18. The sensor readout of claim 10 wherein the predictor further includes a linear to angular converter configured to receive and convert the linear x and linear y components to angular components of the trajectory vector, wherein the angular components are provided to the prediction engine to provide a predicted angular output, and wherein the predicted angular output is provided to an angular to linear converter to obtain predicted linear outputs.

19. The sensor readout of claim 18 and further comprising an offset and gain correction circuit configured to receive the linear x and y components and configured to provide corrected linear x and y components to the linear to angular converter.

20. The sensor readout of claim 19 and further comprising an inverse offset and gain correction circuit configured to undo the effects of the offset and gain correction circuit, wherein the inverse offset and gain correction circuit is configured to receive the predicted linear outputs of the angular to linear converter.

21. The sensor readout of claim 10 wherein the one of the actual sensor signals input to the analog to digital converter is the sensor signal output of either the x component or the y component; and the analog to digital converter provides the digital representation of the x sensor signal output or digital representation of the y sensor signal output that corresponds with the one of the actual sensor signal output.

22. The sensor readout of claim 21 and further comprising a demultiplexer coupled to the predictor and the analog to digital converter, wherein the analog to digital converter is configure to provide a digitized x signal or a digitized y signal corresponding with the one of the sensor signals to the demultiplexer, and wherein the demultiplexer is also configured to receive the predicted sensor signal outputs.

23. The sensor readout of claim 22 wherein the select controller is coupled to demultiplexer, wherein the demultiplexer is configured to pass the one of the actual sensor signals and one of the predicted sensor signal outputs, wherein the one of predicted sensor output is the predicted sensor signal output corresponding with the other of the digitized x or digitized y signals the demultiplexer is configured to pass.

24. The sensor readout of claim 23 and further comprising a linear to angular converter configured to receive the one of the actual sensor signals and the one of the predicted sensor signal outputs passed from the demultiplexer.

25. The sensor readout of claim 21 wherein the analog to digital converter is configure to receive an analog version of a previous one of the digitized x or y.

* * * * *